United States Patent
Saito et al.

(10) Patent No.: US 8,166,375 B2
(45) Date of Patent: Apr. 24, 2012

(54) RADIO COMMUNICATIONS DEVICE AND RECEPTION METHOD

(75) Inventors: Miyoshi Saito, Kawasaki (JP); Koichi Suzuki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 674 days.

(21) Appl. No.: 12/407,552

(22) Filed: Mar. 19, 2009

(65) Prior Publication Data

US 2009/0276677 A1    Nov. 5, 2009

(30) Foreign Application Priority Data

May 1, 2008 (JP) .................................. 2008-119826

(51) Int. Cl.
    *H03M 13/00* (2006.01)
(52) U.S. Cl. .................................................. 714/776
(58) Field of Classification Search .......... 714/752–760, 714/774–777, 784–787, 799, 821
See application file for complete search history.

(56) References Cited

U.S. PATENT DOCUMENTS

| | | | |
|---|---|---|---|
| 7,904,928 B2 * | 3/2011 | Yamaguchi et al. | 725/64 |
| 2002/0003840 A1 * | 1/2002 | Ueda et al. | 375/240.27 |
| 2004/0052229 A1 | 3/2004 | Terry et al. | |
| 2005/0268323 A1 * | 12/2005 | Yamaguchi et al. | 725/143 |
| 2007/0211764 A1 * | 9/2007 | Fujita et al. | 370/498 |
| 2008/0031253 A1 * | 2/2008 | Kim et al. | 370/393 |
| 2009/0310533 A1 * | 12/2009 | Zheng et al. | 370/328 |
| 2010/0135495 A1 * | 6/2010 | Chion et al. | 380/273 |

FOREIGN PATENT DOCUMENTS

| | | |
|---|---|---|
| JP | 6-334700 | 12/1994 |
| JP | 2004179917 | 6/2004 |
| JP | 2005539468 | 12/2005 |

OTHER PUBLICATIONS

IEEE Standard 802.16TM-2004 for Local and metropolitan area networks Part 16: Air Interface for Fixed Broadband Wireless Access Systems.
IEEE Standard 802.16eTM-2005 and IEEE Standard 802.16TM-2004/Cor1-2005 for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1.

* cited by examiner

*Primary Examiner* — Nadeem Iqbal
(74) *Attorney, Agent, or Firm* — Murphy & King, P.C.

(57) ABSTRACT

A radio communications device includes a first error detection part configured to perform error detection on a header included in a packet; a determination part configured to determine whether there is consistency with respect to the length of the packet based on the header in response to the first error detection part detecting no error in the header; a decryption part configured to decrypt the packet in response to the determination part determining that there is consistency with respect to the length of the packet; and a second error detection part configured to perform error detection on the packet in response to the determination part determining that there is consistency with respect to the length of the packet, wherein the decryption part is configured to start to decrypt the packet before completion of the error detection by the second error detection part.

16 Claims, 12 Drawing Sheets

| ESF | CI | ESH LENGTH CHECK DETERMINATION CONDITION |
|---|---|---|
| 0 | — | NO DETERMINATION |
| 1 | — | ESH LENGTH = 0 |
| | 0 | MAC-PDU LENGTH < (ESH LENGTH + 6 BYTES (GMH)) |
| | 1 | MAC-PDU LENGTH < (ESH LENGTH + 6 BYTES (GMH) + 4 BYTES (CRC32)) |

| EC | CI | ESF | EC=1 PAYLOAD=0 CHECK DETERMINATION CONDITION |
|---|---|---|---|
| 0 | — | — | NO DETERMINATION |
| 1 | 0 | 0 | 6 BYTES ≦ MAC-PDU LENGTH < 18 BYTES |
| 1 | 0 | 1 | 6 BYTES + ESH LENGTH ≦ MAC-PDU LENGTH < 18 BYTES + ESH LENGTH |
| 1 | 1 | 0 | 10 BYTES ≦ MAC-PDU LENGTH < 22 BYTES |
| 1 | 1 | 1 | 10 BYTES + ESH LENGTH ≦ MAC-PDU LENGTH < 22 BYTES + ESH LENGTH |

RADIO COMMUNICATIONS DEVICE AND RECEPTION METHOD

CROSS-REFERENCE TO RELATED APPLICATION(S)

This application is based upon and claims the benefit of priority of the prior Japanese Patent Application No. 2008-119826, filed on May 1, 2008, the entire contents of which are incorporated herein by reference.

FIELD

A certain aspect of the embodiments discussed herein is related to a radio communications system.

BACKGROUND

In these years, packet-based radio communications techniques have been widely used. Packet-based radio communications techniques include Worldwide Interoperability for Microwave Access (WiMAX) and wireless LAN. A newer generation of radio communications techniques enjoys a larger transmission capacity. On the other hand, reception in communications devices is hard real-time processing. In hard real-time processing, if processing does not end within a predetermined time, the data that cannot be processed are lost. Thus, as the transmission capacity increases year by year, the importance of techniques for increasing reception throughput in the radio communications technology increases year by year.

A description is given of packet-based radio communications techniques. By way of example, a description is given herein of WiMAX.

Figure 1:
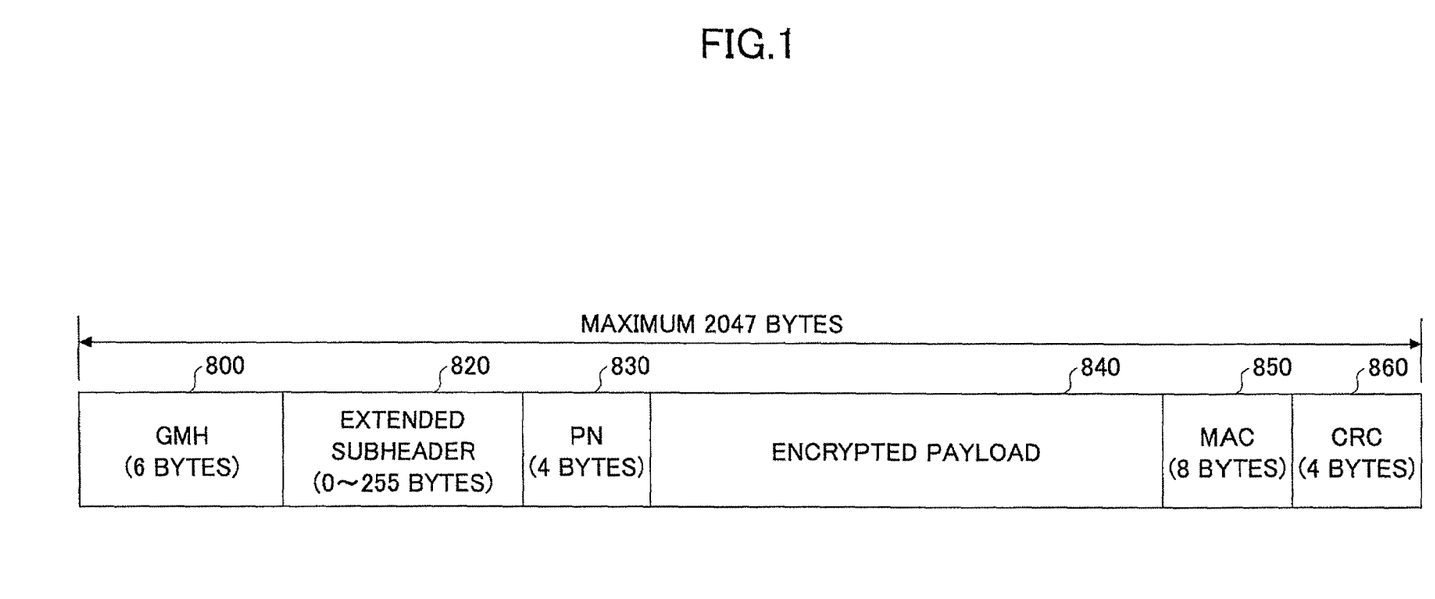
FIG. 1 is a diagram illustrating a MAC-PDU.

FIG. 1 is a diagram illustrating a packet configuration. As an example of the packet, FIG. 1 illustrates a medium access control-protocol data unit (MAC-PDU). Referring to FIG. 1, the MAC-PDU includes a generic MAC header (GMH) 800, an extended subheader 820, a packet number (PN) 830, an encrypted payload 840, a message authentication code (MAC) 850, and a cyclic redundancy check (CRC) 860 (an error-detecting code). The CRC 860 may include CRC-32.

The GMH 800 includes header information. The extended subheader 820 is an extended header. The extended subheader 820 includes additional control information that is not included in the GMH 800. For example, the first byte of the extended subheader 820 includes the data length of the extended subheader 820. For example, the data length of the extended subheader 820 may be up to 255 bytes. The MAC-PDU has a maximum data length of 2047 bytes. This data length is from the start of the GMH 800 to the end of the CRC 860.

Figure 2:
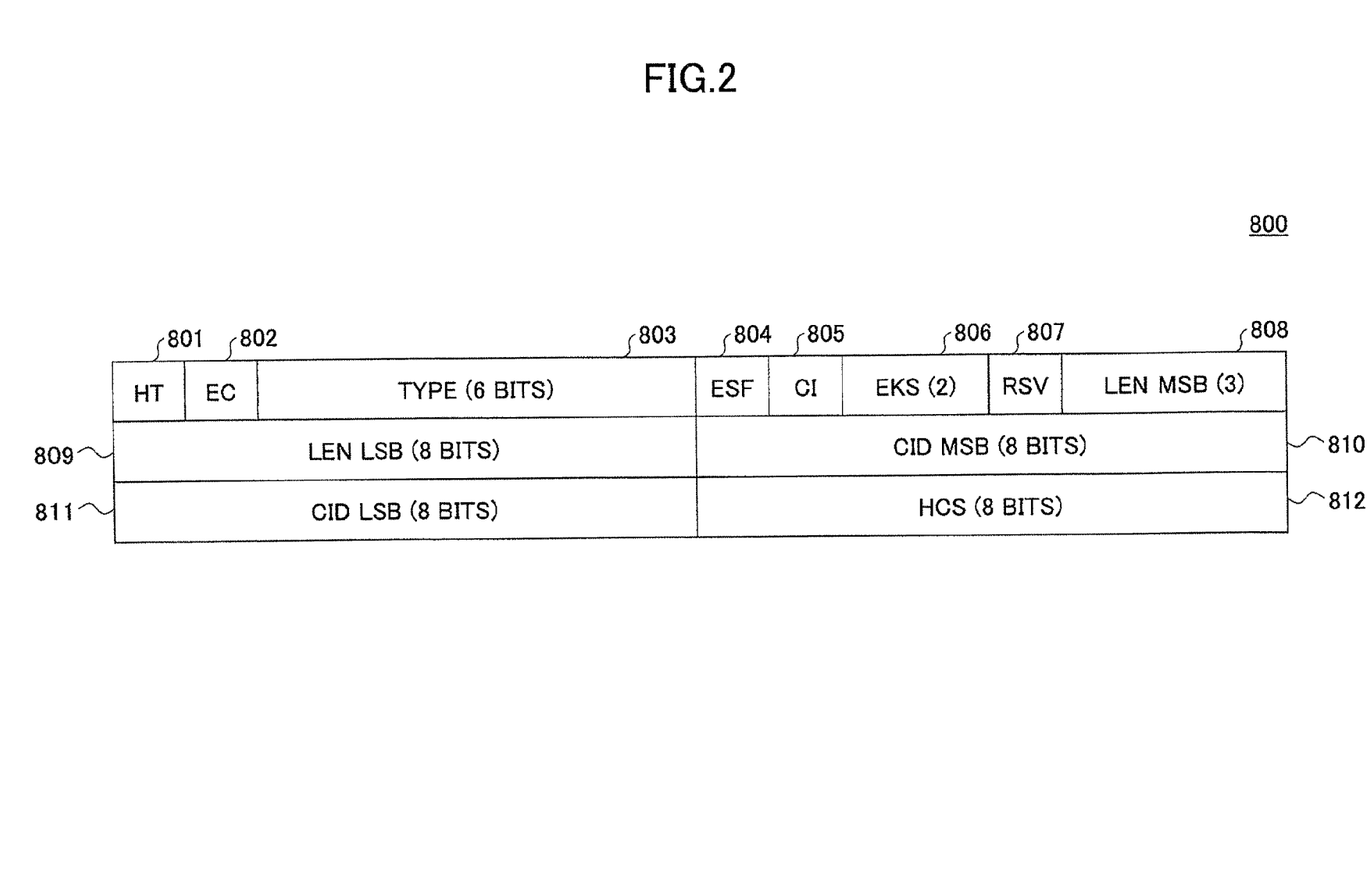
FIG. 2 is a diagram illustrating a GMH.

FIG. 2 is a diagram illustrating the GMH 800. Referring to FIG. 2, the GMH 800 includes a header type (HT) 801, an encryption control (EC) 802, a Type 803, an extended subheader field (ESF) 804, a CRC indicator (CI) 805, an encryption key sequence (EKS) 806, a reserved field (RSV) 807, a subfield data length (LEN) of a most significant bit (MSB) 810, a subfield data length (LEN) of a least significant bit (LSB) 809, a connection identifier (CID) of MSB 810, a connection identifier (CID) of LSB 811, and a header check sequence (HCS) 812 (an error-detecting code).

The Type 803 includes a subheader type. LEN includes the data length of the MAC-PDU. The HCS 812 is included in the sixth byte of the GMH 800. For example, the HCS 812 is generated so as to produce zero (0) as an HCS check result if there is no data corruption in the GMH 800.

Figure 3:
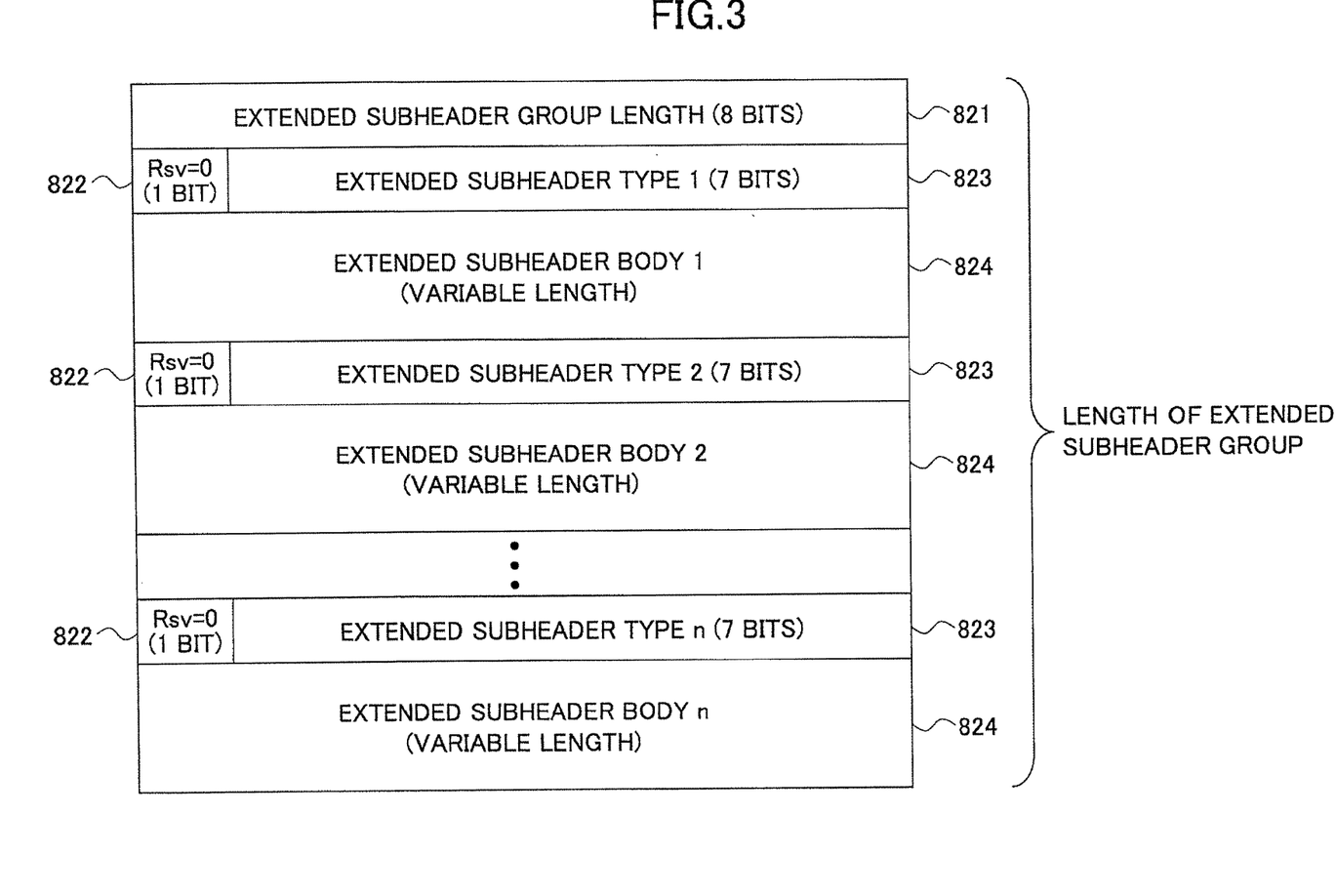
FIG. 3 is a diagram illustrating an extended subheader.

FIG. 3 is a diagram illustrating the extended subheader 820. Referring to FIG. 3, the extended subheader 820 includes an extended subheader group length 821, one or more reserved fields (Rsv) 822, one or more extended subheader type fields 823, and one or more extended subheader body fields 824.

A description is given of reception in communications devices. Here, by way of example, a description is given of WiMAX lower MAC downlink reception. This processing may be implemented with hardware, for example.

Figure 4:
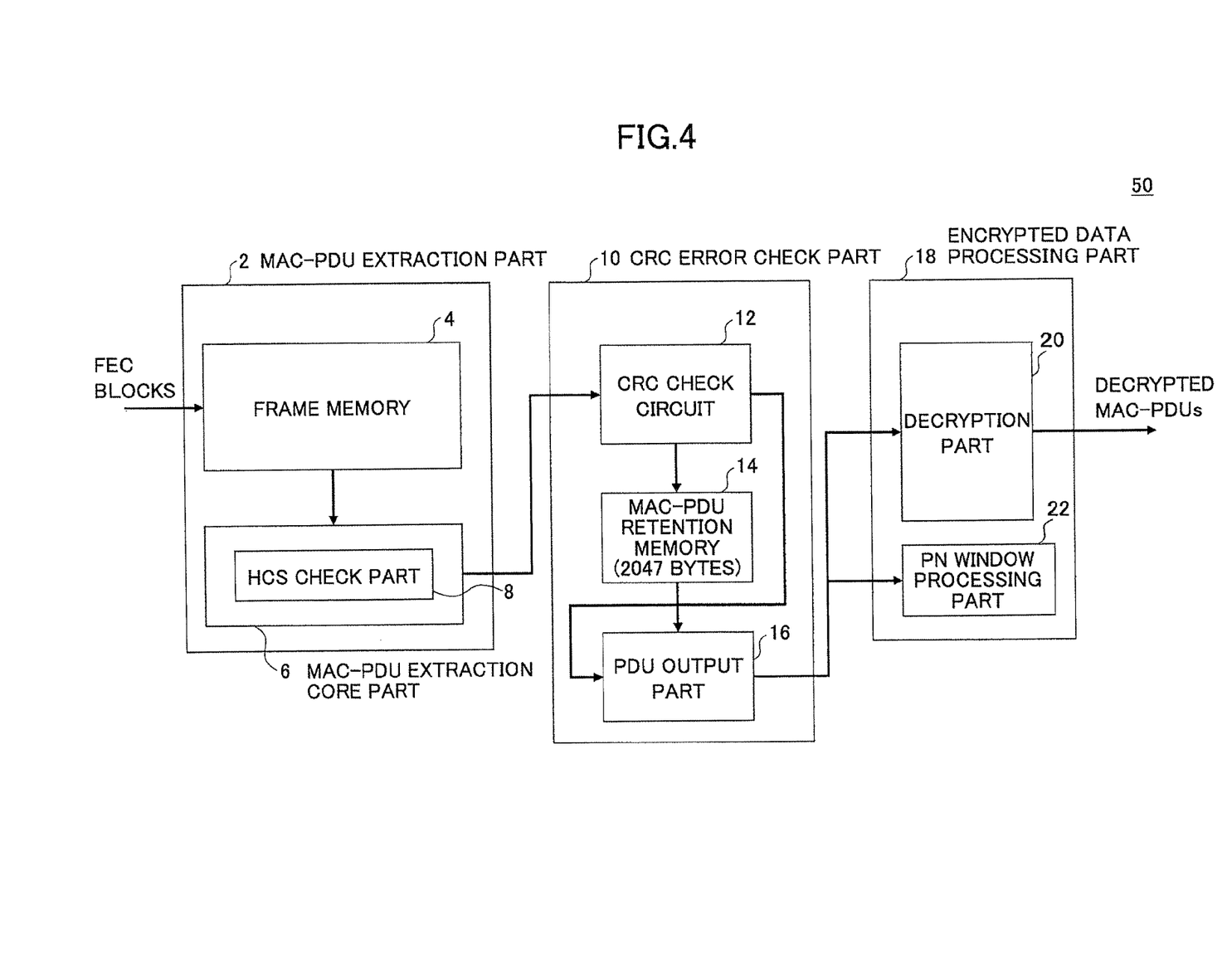
FIG. 4 is a block diagram illustrating part of a radio communications device.

FIG. 4 is a block diagram illustrating part of a radio communications device. Referring to FIG. 4, a communications device 50 includes a MAC-PDU extraction part 2, a CRC error check part 10, and an encrypted data processing part 18. The MAC-PDU extraction part 2 includes a frame memory 4 and a MAC-PDU extraction core part 6. The MAC-PDU extraction core part 16 includes an HCS check part 8. The CRC error check part 10 includes a CRC check circuit 12, a MAC-PDU retention memory 14, and a PDU output part 16. The encrypted data processing part 18 includes a decryption part 20 and a packet number (PN) window processing part 22.

In the MAC-PDU extraction part 2, a MAC-P DU is extracted from data in the frame memory 4. For example, a forward error correction (FEC) block is input to the frame memory 4. The MAC-PDU extraction core part 6 locates a GMH among the data in the frame memory 4. Then, the HCS included in the GMH is checked in the HCS check part 8. The MAC-PDU extraction core part 6 extracts a packet of another unit called a MAC-PDU up to 2047 bytes based on the information included in the GMH including the HCS determined to be correct.

The MAC-PDU extraction core part 6 inputs the MAC-PDU having the GMH including the HCS determined to be correct to the CRC error check part 10. The CRC check circuit 12 stores the input MAC-PDU in the MAC-PDU retention memory 14. Then, the CRC check circuit 12 checks the CRC included in the MAC-PDU. If the CRC check result is NOT CORRECT (NG), this means that there is a data corruption in the MAC-PDU. This CRC check result is input to the PDU output part 16.

The PDU output part 16 may input the MAC-PDU stored in the MAC-PDU retention memory 14 along with the CRC check result to the encrypted data processing part 18. Alternatively, the PDU output part 16 may input the MAC-PDU stored in the MAC-PDU retention memory 14 to the encrypted data processing part 18 if the CRC check result of the MAC-PDU is correct.

The decryption part 20 extracts and decrypts the encrypted payload included in the input MAC-PDU. For example, the decryption part 20 divides the MAC-PDU into a GMH, extended subheader (ESH), packet number (PN), encrypted payload, and message authentication code. Then, the decryption part 20 decrypts the encrypted payload. On the other hand, the packet number window processing part 22 performs packet number window processing based on the packet number.

The encrypted data processing part 18 reconstructs the divided MAC-PDU. This reconstructed MAC-PDU includes a decrypted payload that is produced from the decrypted payload by the decryption part 20.

Figure 5:
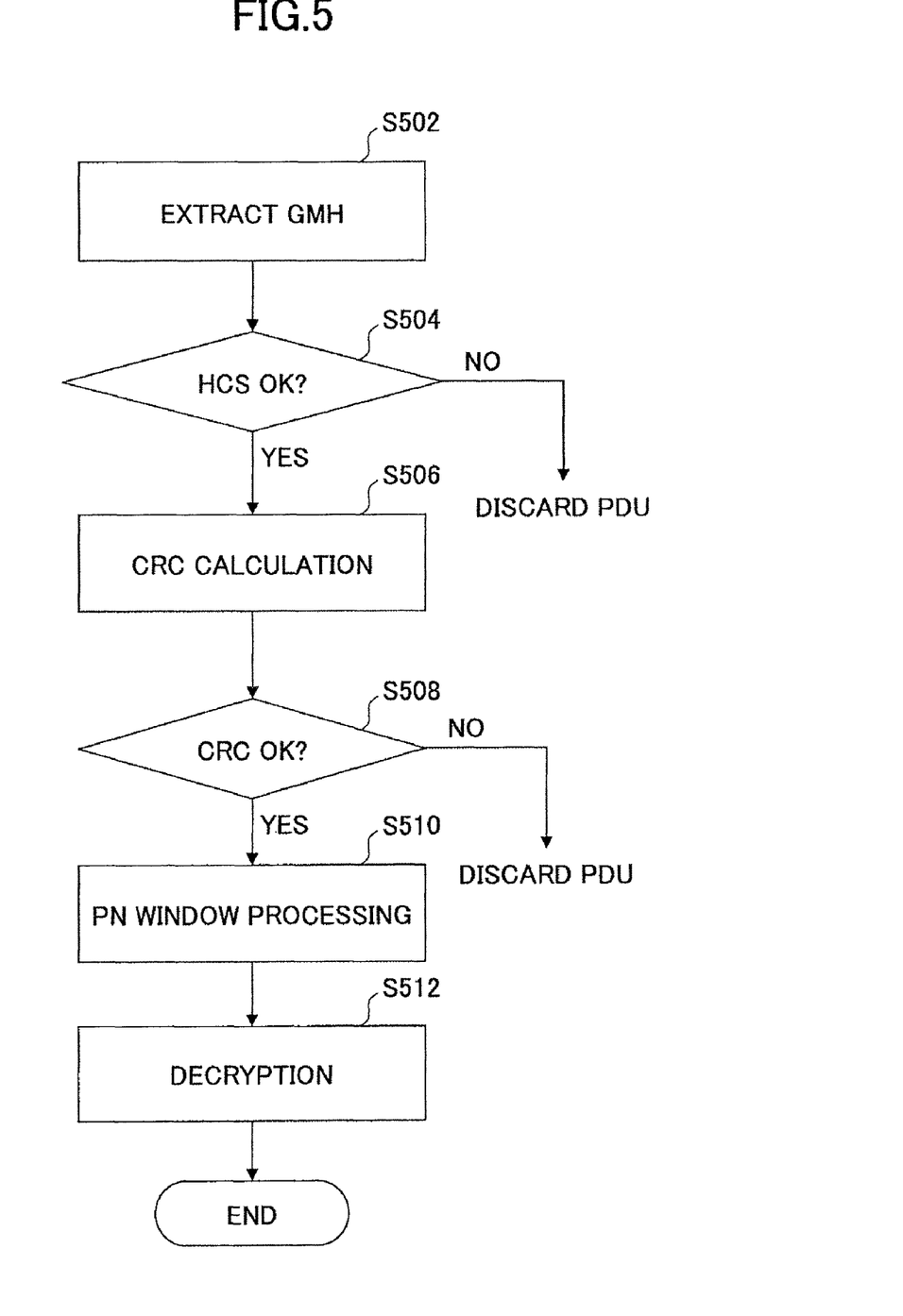
FIG. 5 is a flowchart illustrating an operation of the radio communications device.

A description is given, with reference to FIG. 5 as well as FIG. 4, of a flow of reception in communications devices. This processing may be implemented with software.

Referring to FIG. 5, in step S502, a GMH is extracted from data contained in the frame memory 4.

In step S504, the HCS included in the GMH is checked.

If the HCS is not correct (NO in step S504), a MAC-PDU having the GMH including the HCS is discarded. On the other hand, if the HCS is correct (YES in step S504), in step S505, CRC calculation is performed.

In step S508, the CRC is checked.

If the CRC is not correct (NO in step S508), the MAC-PDU including the CRC is discarded. On the other hand, if the CRC is correct (YES in step S508), in step S510, packet number window processing is performed.

In step S512, decryption is performed. For example, an encrypted payload is decrypted.

Reference may be made to, for example, the following documents for related techniques.

[Non-Patent Document 1] IEEE Std 802.16™-2004
[Non-Patent Document 2] IEEE Std 802.16™-2005 and IEEE Std 802.16™-2004/Cor1-2005

SUMMARY

According to an aspect of the present invention, a radio communications device includes a first error detection part configured to perform error detection on a header included in a packet; a determination part configured to determine whether there is a consistency with respect to a length of the packet based on the header in response to the first error detection part detecting no error in the header; a decryption part configured to decrypt the packet in response to the determination part determining that there is the consistency with respect to the length of the packet; and a second error detection part configured to perform error detection on the packet in response to the determination part determining that there is the consistency with respect to the length of the packet, wherein the decryption part is configured to start to decrypt the packet before a completion of the error detection by the second error detection part.

According to an aspect of the present invention, a reception method includes performing error detection on a header included in a packet; determining whether there is a consistency with respect to a length of the packet based on the header based on a result of the error detection on the header; decrypting the packet in response to determining that there is the consistency with respect to the length of the packet; and performing error detection on the packet in response to determining that there is the consistency with respect to the length of the packet, wherein decrypting the packet starts before a completion of the error detection on the packet.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENT(S)

Decryption and packet number window processing cannot be started before completion of a CRC check. This is because incompletion of the CRC check may mean an error is included in the length of the extended subheader. If the length of the extended subheader includes an error, the PN, encrypted payload, and message authentication code cannot be extracted correctly from the MAC-PDU. In the above-described case of FIG. 5, after completion of the CRC check, the MAC-PDU is subjected to decryption and packet number window processing if the CRC of the MAC-PDU is correct.

The processing latency increases in the case of performing such processing. This is because decryption and packet number window processing are not performed before completion of the CRC check. In particular, the processing latency increases as the MAC-PDU increases in size.

Figure 6:
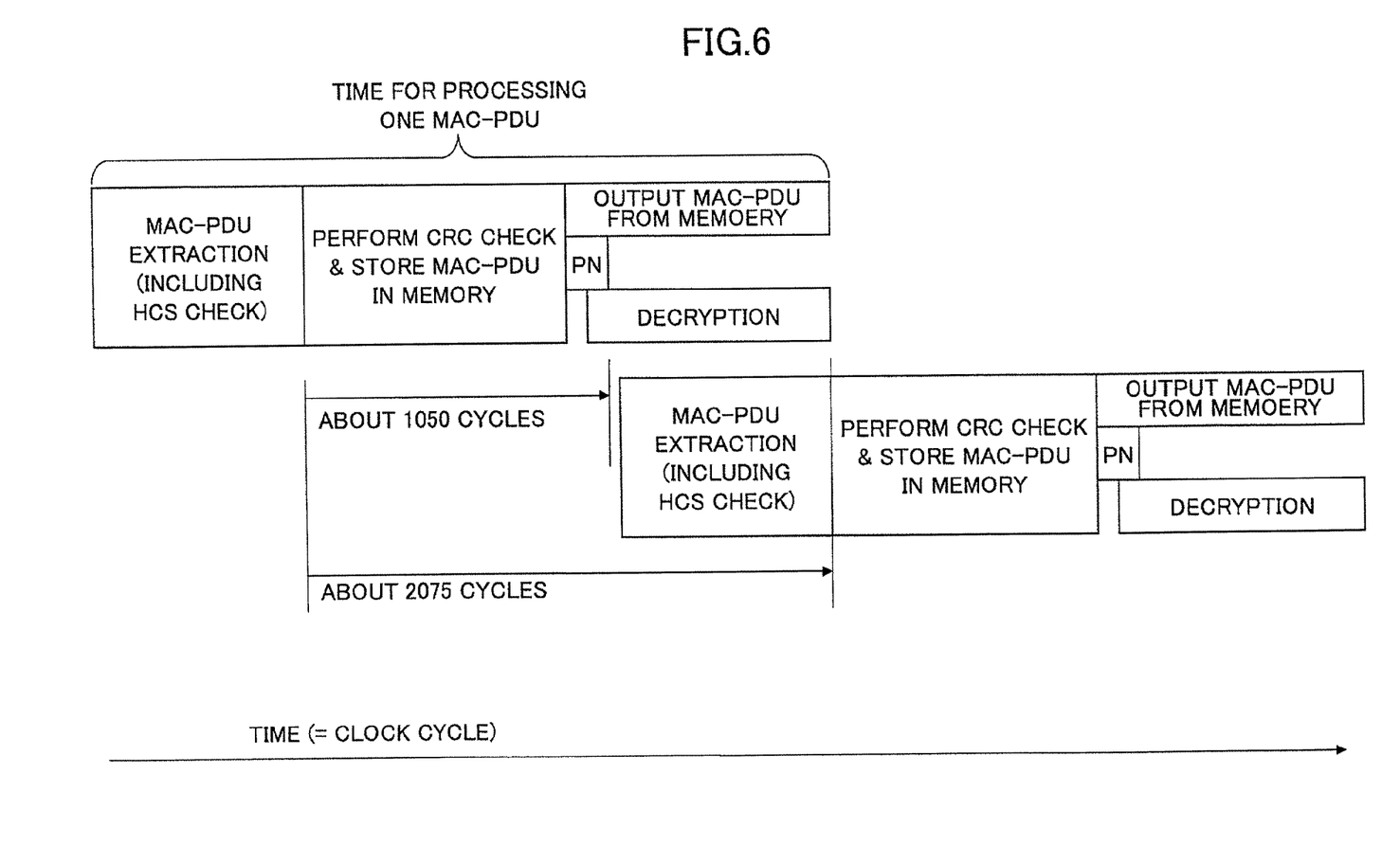
FIG. 6 is a diagram illustrating a MAC-PDU processing time.

A description is given, with reference to FIG. 6, of processing time on a MAC-PDU basis. In FIG. 6, the horizontal axis represents time or a clock cycle. Further, in FIG. 6, packet number window processing is indicated by PN. By way of example, it is assumed that the MAC-PDU size is 2047 bytes, which is a maximum. In this case, assuming that processing is performed every 2 bytes, the shortest latency before it is possible to start processing the next MAC-PDU is about 1050 cycles. Further, there is an interval of about 2075 cycles before the processing of the next MAC-PDU. That is, it takes as much time as about 50 μs in the case of an operating frequency of 44.8 MHz. In terms of throughput, only as much data as 2047 bytes can be processed for this period, thus resulting in low throughput.

Further, in performing a CRC check, a memory for temporarily saving the data of the MAC-PDU is necessary in order to prevent the data of the MAC-PDU that is being checked from being decrypted. For example, a memory of at least 2047 bytes is necessary because the MAC-PDU has a maximum size of 2047 bytes.

In order to improve low throughput, pipelining may be performed at a cycle level. In this case, however, decryption is performed on data before a CRC check. Therefore, there may be an error in extracting the encrypted payload. This error in extracting the encrypted payload prevents decryption from being performed. Further, if there is data corruption in the packet number, this causes error in packet number window processing.

According to one aspect of the present invention, a radio communications device and a reception method are provided that improve throughput in reception.

Preferred embodiments of the present invention will be explained with reference to accompanying drawings.

In the drawings for illustrating the embodiments, those having the same function are referred to by the same reference numeral, and a repetitive description thereof is omitted.

(a) First Embodiment

A description is given of a communications system according to a first embodiment of the present invention.

A communications system according to this embodiment includes radio communications devices. Packets including MAC-PDUs are exchanged between radio communications devices. For example, the radio communications device may be included either in a base station or in a mobile station. Alternatively, the radio communications device may be included in each of the base station and the mobile station. Further, the MAC-PDU includes a header and an extended header. For example, the extended header may include additional control information that is not included in the header. The header may also be referred to as "generic MAC header (GMH)." The extended header may also be referred to as "extended subheader." Communications systems satisfying these requirements include WiMAX. Therefore, in this embodiment, a description is given, taking WiMAX as an example communications system. The present invention is also applicable to communications systems other than WiMAX as long as they satisfy these requirements.

Time Division Duplex (TDD) is applied to WiMAX. According to TDD, an uplink (UL) signal and a downlink (DL) signal are transmitted in the same frequency band and an uplink and a downlink are switched at high speed, so that full duplex communications are performed. A transmission frame in TDD includes a downlink sub-frame in which a downlink signal is transmitted and an uplink sub-frame in which an uplink signal is transmitted. Further, Orthogonal Frequency Division Multiplexing (OFDM)/Orthogonal Frequency Division Multiple Access (OFDMA) is applied to WiMAX.

Figure 7:
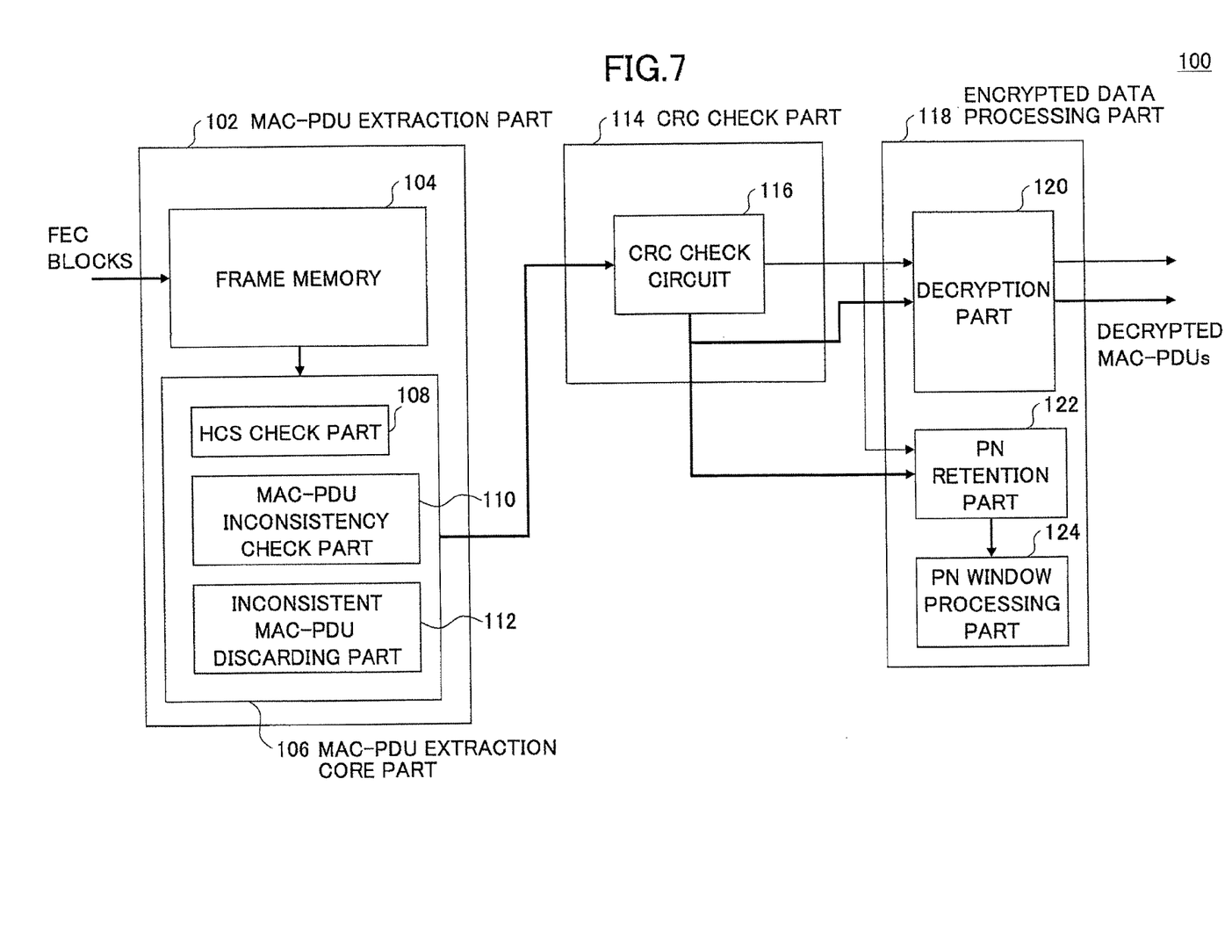
FIG. 7 is a block diagram illustrating part of a radio communications device according to a first embodiment of the present invention.

A description is given, with reference to FIG. 7, of a radio communications device according to this embodiment.

A radio communications device 100 according to this embodiment includes a MAC-PDU extraction part 102. The MAC-PDU extraction part 102 extracts a MAC-PDU from an input FEC block. In FIG. 7, an FEC block is input to the MAC-PDU extraction part 102. However, the input is not limited to an FEC block, and may be one of data pieces into which the FEC block is segmented or large unit data including multiple FEC blocks.

The MAC-PDU extraction part 102 includes a frame memory 104. The frame memory 104 stores the input FEC block.

The MAC-PDU extraction part 102 includes a MAC-PDU extraction core part 106. The MAC-PDU extraction core part 106 detects a GMH from the FEC block stored in the frame memory 104. Further, the MAC-PDU extraction core part 106 performs error detection on the extracted GMH based on the HCS included in the GMH. Further, the MAC-PDU extraction core part 106 extracts an extended subheader field and a CRC indicator from the GMH in which no error has been detected. Then, the MAC-PDU extraction core part 106 determines whether it is possible to decrypt a MAC-PDU including the GMH based on the extracted extended subheader field and CRC indicator. Further, the MAC-PDU extraction core part 106 may discard a MAC-PDU which has been determined as undecryptable.

A specific description is given. The MAC-PDU extraction core part 106 includes an HCS check part 108. The HCS check part 108 detects a GMH from the FEC block stored in the frame memory 104. Further, the HCS check part 108 performs error detection on the extracted GMH based on the HCS included in the GMH.

Figure 8:
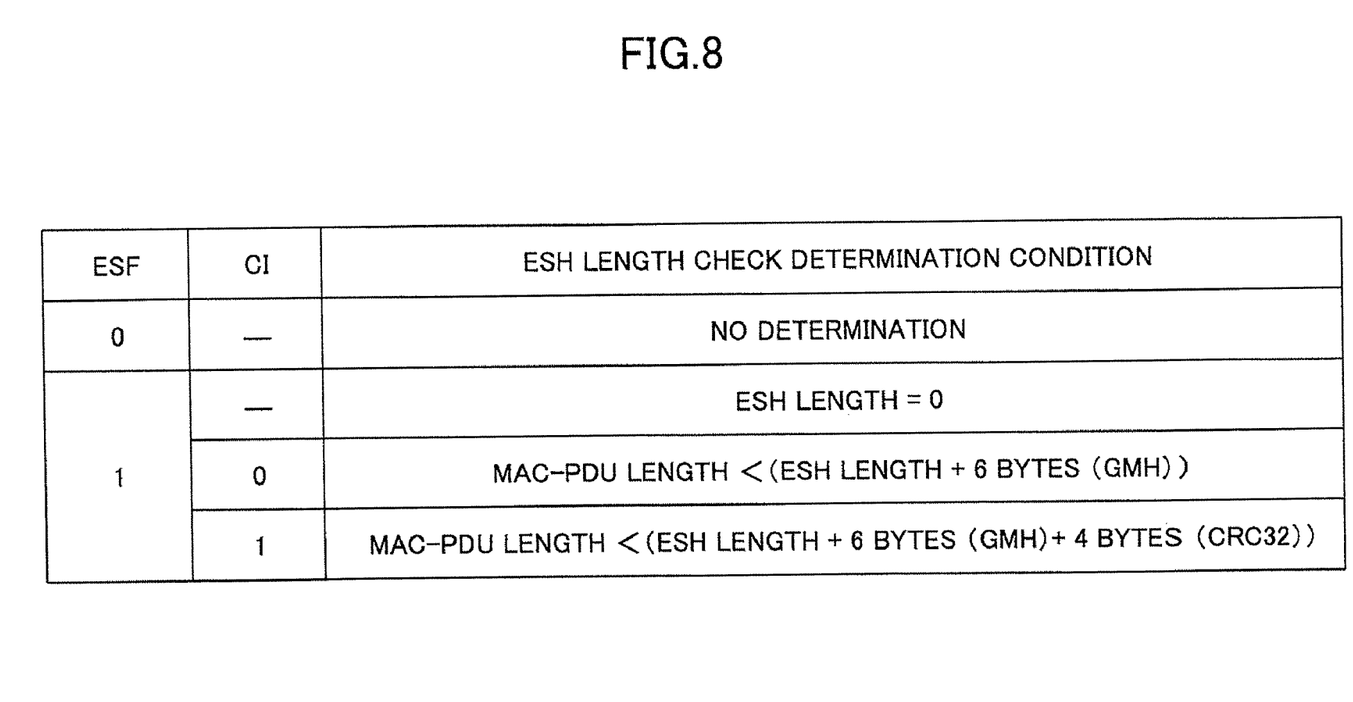
FIG. 8 is a diagram illustrating processing by the radio communications device according to the first embodiment of the present invention.

The MAC-PDU extraction core part 106 includes a MAC-PDU inconsistency check part 110. The MAC-PDU inconsistency check part 110 determines, based on the GMH in which no error has been detected, whether it is possible to decrypt a MAC-PDU including the GMH. For example, the MAC-PDU inconsistency check part 110 may be configured to determine the presence or absence of inconsistency in the length of the extended subheader field. In other words, the MAC-PDU inconsistency check part 110 checks the (incorrectness of the length of the extended subheader. Of the information elements included in the MAC-PDU, the GMH is protected by the HCS. On the other hand, the extended subheader may be erroneous unless it is determined by a CRC check that there is no error. Therefore, the MAC-PDU inconsistency check part 110 determines whether it is possible to decrypt a MAC-PDU including the GMH in which no error has been detected. For example, the MAC-PDU inconsistency check part 110 extracts an extended subheader field and a CRC indicator from the GMH in which no error has been detected. Then, the MAC-PDU inconsistency check part 110 determines, based on the extracted extended subheader field and CRC indicator, whether it is possible to decrypt a MAC-PDU including the GMH. For example, as illustrated in FIG. 8, if the value of the extended subheader field is zero (0), the MAC-PDU inconsistency check part 110 does not determine whether it is possible to decrypt the MAC-PDU. This is because no extended subheader is included if the value of the extended subheader field is 0. In this case, the MAC-PDU extraction core part 106 may input the MAC-PDU to a below-described CRC check part 114.

Further, for example, if the value of the extended subheader field is one (1), the MAC-PDU inconsistency check part 110 performs the following processing.

As illustrated in FIG. 8, if the value of the extended subheader field is 1 and the length of the extended subheader is 0, the MAC-PDU inconsistency check part 110 determines that there is inconsistency. This is because the value 1 of the extended subheader field indicates that the MAC-PDU includes an extended subheader and this is inconsistent with the subheader length being 0.

Further, as illustrated in FIG. 8, if the value of the extended subheader field is 1 and the value of the CRC indicator is 0, the MAC-PDU inconsistency check part 110 determines that there is inconsistency if the length of the MAC-PDU is less than the sum of the length of the extended subheader and the length of the GMH. The MAC-PDU inconsistency check part 110 determines the length of the MAC-PDU based on the LEN included in the GMH. Then, the MAC-PDU inconsistency check part 110 can determine the length of the extended subheader by decrypting the extended subheader and referring to the extended subheader group length included in the extended subheader. Further, the MAC-PDU inconsistency check part 110 has been informed that the length of the GMH is 6 bytes. The MAC-PDU inconsistency check part 110 determines the sum of the length of the extended subheader and the length of the GMH, and determines that there is inconsistency if the length of the MAC-PDU is less than the determined sum.

Further, if the value of the extended subheader field is 1 and the value of the CRC indicator is 1, the MAC-PDU inconsistency check part 110 determines that there is inconsistency if the length of the MAC-PDU is less than the sum of the length of the extended subheader, the length of the GMH, and the length of the CRC. The MAC-PDU inconsistency check part 110 determines the length of the MAC-PDU based on the LEN included in the GMH. Then, the MAC-PDU inconsistency check part 110 can determine the length of the extended subheader by decrypting the extended subheader and referring to the extended subheader group length included in the extended subheader. Further, the MAC-PDU inconsistency check part 110 has been informed that the length of the GMH is 6 bytes. Further, the MAC-PDU inconsistency check part 110 has been informed of the length of the CRC. For example, the length of the CRC is 4 bytes if the CRC is CRC-32. The MAC-PDU inconsistency check part 110 determines the sum of the length of the extended subheader, the length of the GMH, and the length of the CRC, and determines that there is inconsistency if the length of the MAC-PDU is less than the determined sum.

The MAC-PDU extraction core part 106 includes an inconsistent MAC-PDU discarding part 112. The inconsistent MAC-PDU discarding part 112 discards a MAC-PDU determined as inconsistent.

The MAC-PDU extraction core part 106 inputs a MAC-PDU that has not been determined as inconsistent to the CRC check part 114. In other words, a MAC-PDU whose GMH has been determined as correct based on an HCS check and which has not been determined as inconsistent is input to the CRC check part 114.

The radio communications device 100 according to this embodiment includes the CRC check part 114. The CRC check part 114 includes a CRC check circuit 116. The CRC check part 114 inputs the input MAC-PDU to a below-described decryption part 120 and packet number retention part 122. The MAC-PDU input to the decryption part 120 and the packet number retention part 122 may be a MAC-PDU before being subjected to a CRC check. For example, the CRC check part 114 may input a MAC-PDU to the decryption part 120 and the packet number retention part 122 in a pipelining manner. For example, the CRC check part 114 may input a MAC-PDU 2 bytes by 2 bytes. Further, the CRC check part 114 performs error detection based on the CRC included in the MAC-PDU. This error detection is carried out by the CRC check circuit 116. The CRC check part 114 inputs the result of the error detection to the decryption part 120 and the packet number retention part 122.

The radio communications device according to this embodiment includes an encrypted data processing part 118. The encrypted data processing part 118 decrypts an input MAC-PDU. Further, the encrypted data processing part 118 retains the packet number included in the input MAC-PDU. Further, the encrypted data processing part 118 performs packet number window processing based on the retained packet number.

The encrypted data processing part 118 includes the decryption part 120. The decryption part 120 decrypts the input MAC-PDU. Then, the decryption part 120 outputs the decrypted MAC-PDU and its CRC check result.

The encrypted data processing part 118 includes the packet number retention part 122. The packet number retention part 122 retains an input packet number. The packet number is located at the leading part of the MAC-PDU. Therefore, the CRC check part 114 may not have completed a CRC check when the decryption part 120 receives the packet number. Therefore, the MAC-PDU may include an erroneous packet number. Therefore, the packet number retention part 122 retains the packet number. The packet number retention part 122 causes a below-described packet number window processing part 124 to start packet number window processing if the CRC check result input by the CRC check part 114 shows correctness. Then, the packet number retention part 122 inputs the packet number to the packet number window processing part 124. As a result, packet number window processing is started after completion of a CRC check. Therefore, problems arising from a wrong packet number are avoided. Here, problems arising from a wrong packet number include detection of an error due to data corruption in the packet number.

The encrypted data processing part 118 includes the packet number window processing part 124. The packet number window processing part 124 performs window processing based on the packet number retained in the packet number retention part 122. For example, if the same packet numbers are input, the packet number window processing part 124 may discard a MAC-PDU including the packet number that has been input second or later. Further, if an input MAC-PDU includes a smaller packet number than the MAC-PDU input immediately before it, the packet number window processing part 124 discards the later-input MAC-PDU (including the smaller packet number) based on its packet number. Further, the packet number window processing part 124 may be configured to determine whether to discard the MAC-PDU including the smaller packet number based on a packet number window size. For example, the packet number window processing part 124 determines an allowable range of packet numbers included in MAC-PDUs to be input based on the packet number included in the input MAC-PDU and a packet number window size. For example, packet numbers may be allowed that are in a packet number range extending backward (in the direction of a descending [reversing] order of packet numbers) for the packet number window size from the packet number included in the input MAC-PDU. That is, packet numbers may be allowed that are smaller than the packet number included in the input MAC-PDU in the range of the packet number window size extending from the packet number included in the input MAC-PDU to a predetermined packet number. In this case, the range is not changed even after a MAC-PDU having a packet number within the range is input.

For example, in an upper layer, processing is performed based on the input MAC-PDU and its CRC check result. For example, in an upper layer, if the CRC check result is correct, the input MAC-PDU is received, and if the CRC check result is not correct, the input MAC-PDU is discarded.

Figure 9:
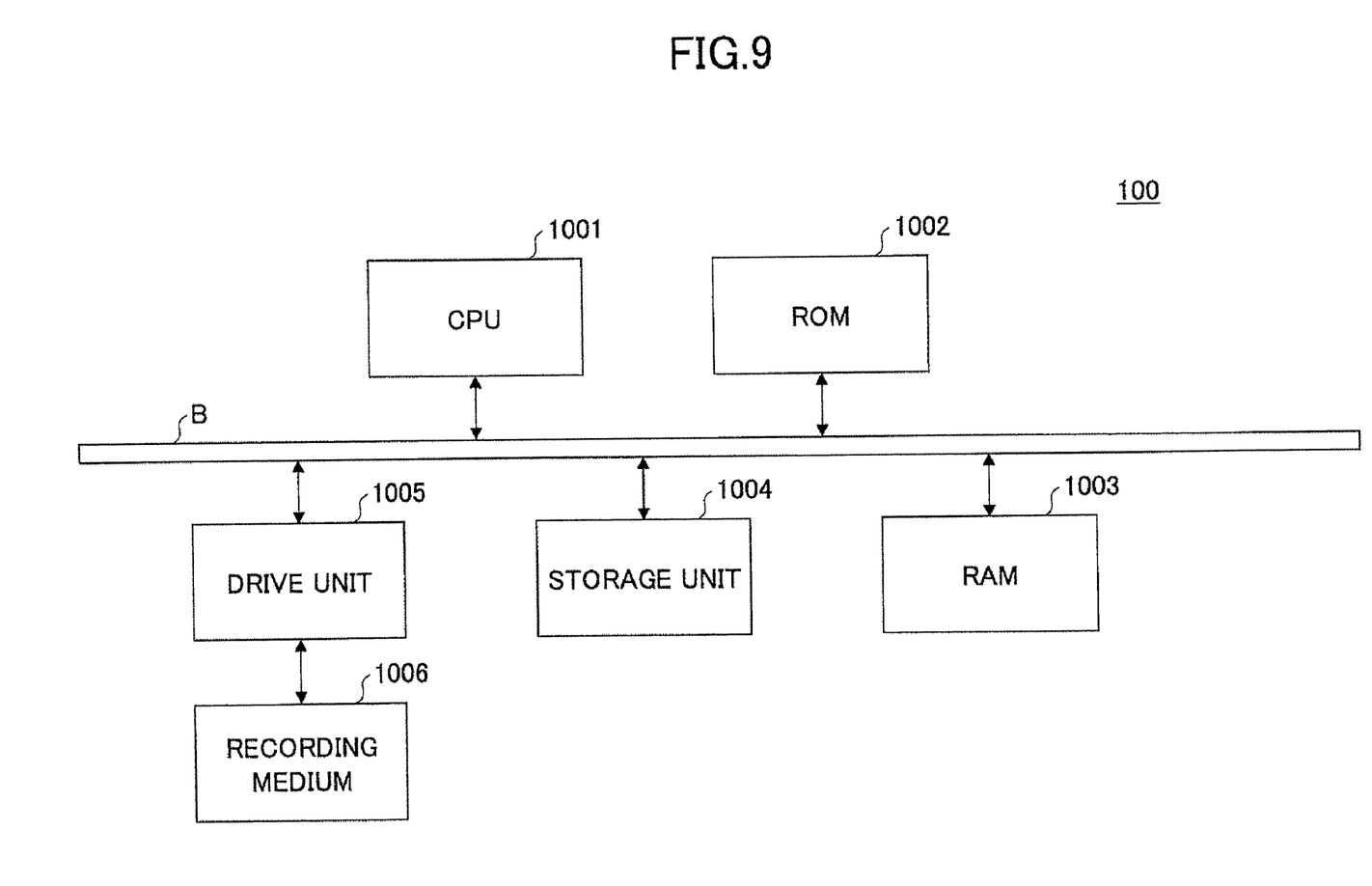
FIG. 9 is a block diagram illustrating a hardware configuration of the radio communications device according to the first embodiment of the present invention.

A description is given, with reference to FIG. 9, of a hardware configuration of the radio communications device 100 according to this embodiment.

The radio communications device 100 includes a CPU 1001, a read-only memory (ROM) 1002, a random access memory (RAM) 1003, and a large-capacity storage unit 1004 such as a hard disk unit, which are interconnected with a bus B. The radio communications device 100 may further include a drive unit 1005.

A program for causing a computer to operate as the radio communications device 100 may be provided in the form of being recorded in a recording medium 1006 such as a flexible disk, a CR-ROM, or a memory card. By loading the recording medium 1006 into the drive unit 1005, the program recorded in the recording medium 1006 is read. The CPU 1001 writes the read program in the RAM 1003 or the storage unit 1004, and executes processing as described in this embodiment in accordance with the program. Alternatively, the program may be downloaded through a communications network or be copied from a storage medium and installed in the storage unit 1004 to be executed.

Figure 10:
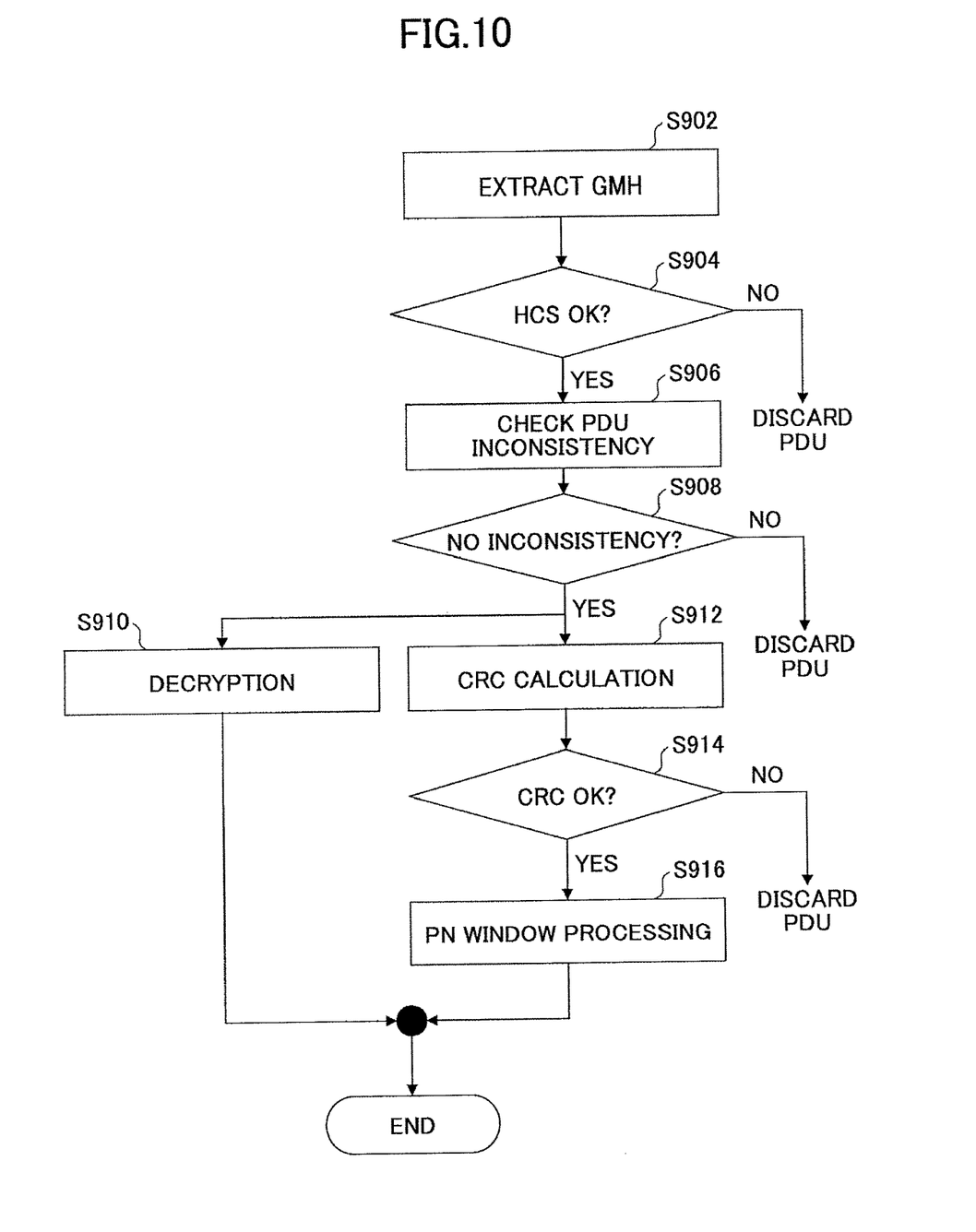
FIG. 10 is a flowchart illustrating an operation of the radio communications device according to the first embodiment of the present invention.

A description is given, with reference to FIG. 10 as well as FIG. 7, of a flow of reception in the radio communications device 100 according to this embodiment. For example, this processing may be implemented with software. For example, this processing may be implemented with the above-described program.

Referring to FIG. 10, in step S902, a GMH is extracted from the data contained in the frame memory 104. For example, the CPU 1001 (FIG. 9) may be caused by the above-described program to implement the function of the MAC-PDU extraction core part 106 to locate a GMH among the data contained in the frame memory 104, and to extract the GMH.

In step S904, the HCS included in the GMH is checked. For example, the CPU 1001 may be caused by the program to implement the function of the HCS check part 108 to check the HCS included in the GMH.

If the HCS is not correct (NO in step S904), a MAC-PDU having the GMH including the HCS is discarded. On the other hand, if the HCS is correct (YES in step S904), in step S906, it is determined whether there is any inconsistency in the MAC-PDU. For example, the CPU 1001 may be caused by the program to implement the function of the MAC-PDU inconsistency check part 110 to extract an extended subheader field and a CRC indicator from the GMH that has been determined as correct. The CPU 1001 is caused to implement the function of the MAC-PDU inconsistency check part 110 to check the (in)correctness of the length of the extended subheader based on the extracted extended subheader field and CRC indicator using the above-described method.

If it is not determined that there is no inconsistency (NO in step S908), the MAC-PDU is discarded. For example, the CPU 1001 may be caused by the program to implement the function of the inconsistent MAC-PDU discarding part 112 to discard the MAC-PDU that has not been determined as not having inconsistency. On the other hand, if it is determined that there is no inconsistency (YES in step S908), the MAC-PDU is subjected to decryption in step S910 and to CRC calculation in step S912. For example, the CPU 1001 may be caused by the program to implement the function of the MAC-PDU extraction core part 106 to input the MAC-PDU determined as having no inconsistency to the CRC check part 114. The CPU 1001 is caused to implement the function of the CRC check part 114 to input the input MAC-PDU to the encrypted data processing part 118. The CPU 1001 is caused to implement the function of the decryption part 120 to decrypt the input MAC-PDU. For example, the CPU 1001 may be caused by the program to implement the function of the decryption part 120 to decrypt an encrypted payload. Further, the CPU 1001 is caused to implement the function of the CRC check part 114 to perform calculation based on the CRC included in the input MAC-PDU. Thus, decryption is started before completion of CRC-based error detection, that is, before an error, if any, is detected by a CRC check.

In step S914, the CPU 1001 is caused to implement the function of the CRC check part 114 to determine whether the CRC is correct.

If it is not determined that the CRC is correct (NO in step S914), the MAC-PDU including the CRC may be discarded. On the other hand, if it is determined that the CRC is correct (YES in step S914), in step S916, packet number window processing is performed. For example, the CPU 1001 may be caused by the program to implement the function of the packet number retention part 122 to retain the packet number included in the input MAC-PDU. When the CRC check result is input, the CPU 1001 is caused to implement the function of the packet number retention part 122 to input the packet number corresponding to the CRC check result to the packet number window processing part 124 if the input CRC check result shows correctness. The CPU 1001 is caused to implement the function of the packet number window processing part 124 to perform packet number window processing based on the input packet number.

Then, the CPU 1001 is caused to implement the function of the encrypted data processing part 118 to input the decrypted MAC-PDU and its CRC check result to an upper layer.

Figure 11:
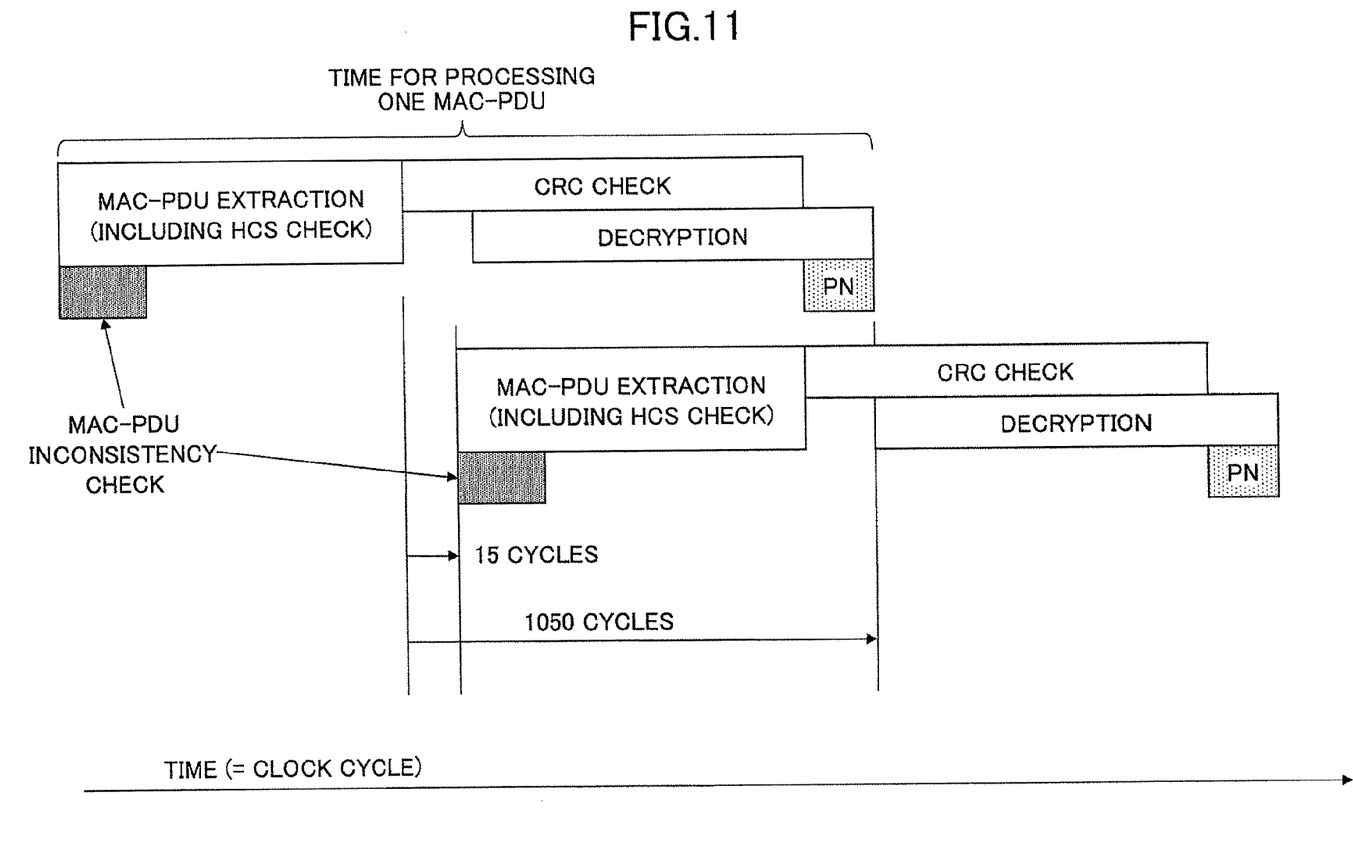
FIG. 11 is a diagram illustrating a MAC-PDU processing time according to the first embodiment of the present invention.

A description is given, with reference to FIG. 11, of a MAC-PDU processing time in the radio communications device 100 according to this embodiment.

In FIG. 11, the horizontal axis represents time or a clock cycle. Further, in FIG. 11, packet number window processing is indicated by PN. By way of example, it is assumed that the MAC-PDU size is 2047 bytes, which is a maximum. In this case, assuming that processing is performed every 2 bytes, the shortest latency before it is possible to start processing the next MAC-PDU is about 15 cycles, which is approximately one-seventieth (1/70) of the latency of the case illustrated in FIG. 6. Further, the interval before the processing of the next MAC-PDU is approximately 1050 cycles, which is approximately a half of the processing interval of the case illustrated in FIG. 6. That is, it takes about 23 μs in the case of an operating frequency of 44.8 MHz. Accordingly, the throughput is nearly doubled compared with the case illustrated in FIG. 6.

In this embodiment, a description is given of the case where the MAC-PDU extraction part 102 includes the MAC-PDU inconsistency check part 110. However, the MAC-PDU inconsistency check part 110 does not have to be included in the MAC-PDU extraction part 102 as long as the MAC-PDU inconsistency check part 110 precedes the processing by the decryption part 120. For example, the MAC-PDU inconsistency check part 110 may be between the MAC-PDU extraction part 102 and the CRC check part 114. Alternatively, the MAC-PDU inconsistency check part 110 may be between the CRC check part 114 and the encrypted data processing part 118.

(b) Second Embodiment

A communications system according to a second embodiment of the present invention is the same as that described in the first embodiment.

A description is given of a radio communications device according to this embodiment.

The radio communications device 100 according to this embodiment is different from that of the first embodiment in the processing in the MAC-PDU inconsistency check part 110.

The MAC-PDU inconsistency check part 110 of the radio communications device 100 according to this embodiment determines, based on a GMH in which no error has been detected, whether it is possible to decrypt a MAC-PDU including the GMH. For example, the MAC-PDU inconsistency check part 110 may be configured to determine whether there is no inconsistency in the length of a payload. Of the information elements included in the MAC-PDU, the GMH is protected by the HCS, but "slipping through" occurs at a rate of 0.4% (1/255). Since a subsequent CRC check is not completed, inconsistency is also checked with respect to this "slipping through." Further, the extended subheader may be erroneous unless it is determined by a CRC check that there is no error. Therefore, the MAC-PDU inconsistency check part 110 determines whether it is possible to decrypt a MAC-PDU including the GMH in which no error has been detected.

Figure 12:
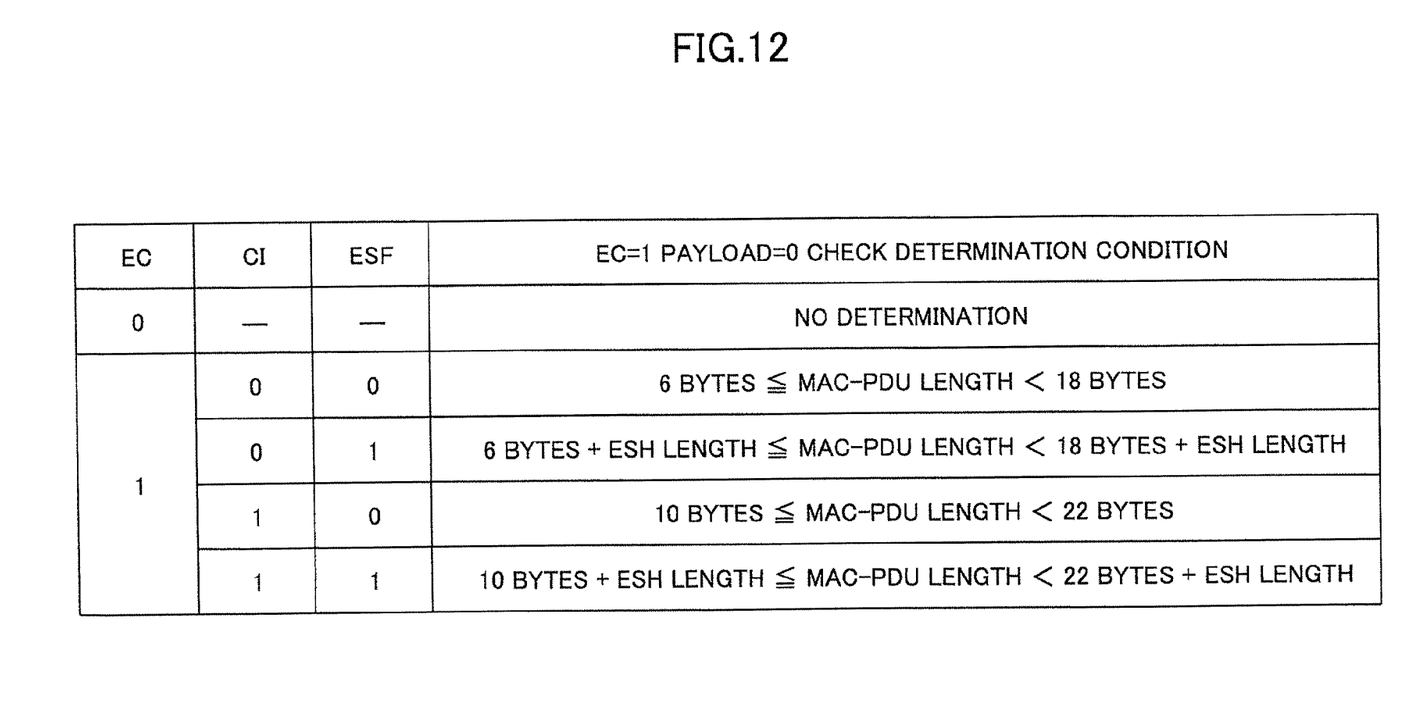
FIG. 12 is a diagram illustrating processing by the radio communications device according to a second embodiment of the present invention.

For example, the MAC-PDU inconsistency check part 110 extracts encryption control (EC), an extended subheader field and a CRC indicator from the GMH in which no error has been detected. Then, the MAC-PDU inconsistency check part 110 determines, based on the extracted EC, extended subheader field, and CRC indicator, whether it is possible to decrypt a MAC-PDU including the GMH. For example, as illustrated in FIG. 12, if the value of the EC is zero (0), the MAC-PDU inconsistency check part 110 does not determine whether it is possible to decrypt the MAC-PDU. This is because the payload is not encrypted if the value of the extended subheader field is 0.

On the other hand, as illustrated in FIG. 12, if the value of the EC is one (1), the MAC-PDU inconsistency check part 110 performs the following processing.

If the value of the CRC indicator is 0 and the value of the extended subheader field is 0, the MAC-PDU inconsistency check part 110 determines that there is inconsistency if the length of the MAC-PDU is more than or equal to the length of the GMH and less than the sum of the length of the GMH, the length of the packet number, and the length of the message authentication code. This is because the MAC-PDU is assumed to include no payload if these conditions are met. If the value of the CRC indicator is 0, the MAC-PDU includes no CRC. If the value of the extended subheader field is 0, the MAC-PDU includes no extended subheader. By way of example, a description is given of the case where the GMH is 6 bytes in length, the packet number is 4 bytes in length, and the message authentication code is 8 bytes in length. In this case, if the MAC-PDU is more than or equal to 6 bytes and less than 18 bytes in length, the MAC-PDU inconsistency check part 110 determines that there is inconsistency in the MAC-PDU (the MAC-PDU is inconsistent). Here, it is because it is standardized to set the EC value to 0 if the payload length is 0 that the MAC-PDU inconsistency check part 110 does not determine whether the length of the MAC-PDU is less than or equal to the sum of the length of the GMH, the length of the packet number, and the length of the message authentication code.

If the value of the CRC indicator is 0 and the value of the extended subheader field is 1, the MAC-PDU inconsistency check part 110 determines that there is inconsistency if the length of the MAC-PDU is more than the sum of the length of the GMH and the length of the extended subheader and less than the sum of the length of the GMH, the length of the extended subheader, the length of the packet number, and the length of the message authentication code. In this case, the MAC-PDU inconsistency check part 110 decrypts the extended subheader and obtains information indicating the length of the extended subheader. If the value of the CRC indicator is 0, the MAC-PDU includes no CRC. If the value of the extended subheader field is 1, the MAC-PDU includes an extended subheader. By way of example, a description is given of the case where the GMH is 6 bytes in length, the packet number is 4 bytes in length, and the message authentication code is 8 bytes in length. In this case, the MAC-PDU inconsistency check part 110 determines that there is inconsistency in the MAC-PDU (the MAC-PDU is inconsistent) if the length of the MAC-PDU is more than or equal to the sum of 6 bytes and the length of the extended subheader and less than the sum of 18 bytes and the length of the extended subheader.

If the value of the CRC indicator is 1 and the value of the extended subheader field is 0, the MAC-PDU inconsistency check part 110 determines that there is inconsistency if the length of the MAC-PDU is more than or equal to the sum of the length of the GMH and the length of the CRC and less than the sum of the length of the GMH, the length of the packet number, the length of the message authentication code, and the length of the CRC. In this case, if the value of the CRC indicator is 1, the MAC-PDU includes a CRC. If the value of the extended subheader field is 0, the MAC-PDU includes no extended subheader. By way of example, a description is given of the case where the GMH is 6 bytes in length, the packet number is 4 bytes in length, the message authentication code is 8 bytes in length, and the CRC is 4 bytes in length. In this case, the MAC-PDU inconsistency check part 110 determines that there is inconsistency in the MAC-PDU (the MAC-PDU is inconsistent) if the length of the MAC-PDU is more than or equal to 10 bytes and less than 22 bytes.

If the value of the CRC indicator is 1 and the value of the extended subheader field is 1, the MAC-PDU inconsistency check part 110 determines that there is inconsistency if the length of the MAC-PDU is more than or equal to the sum of the length of the GMH, the length of the extended subheader, and the length of the CRC and less than the sum of the length of the GMH, the length of the extended subheader, the length of the packet number, the length of the message authentication code, and the length of the CRC. In this case, the MAC-PDU inconsistency check part 110 decrypts the extended subheader and obtains information indicating the length of the extended subheader. If the value of the CRC indicator is 1, the MAC-PDU includes a CRC. If the value of the extended subheader field is 1, the MAC-PDU includes an extended subheader. By way of example, a description is given of the case where the GMH is 6 bytes in length, the packet number is 4 bytes in length, the message authentication code is 8 bytes in length, and the CRC is 4 bytes in length. In this case, the MAC-PDU inconsistency check part 110 determines that there is inconsistency in the MAC-PDU (the MAC-PDU is inconsistent) if the length of the MAC-PDU is more than or equal to the sum of 10 bytes and the length of the extended subheader and less than the sum of 22 bytes and the length of the extended subheader.

A flow of reception in the radio communications device 100 according to this embodiment is the same as the operation illustrated with reference to FIG. 10.

According to one aspect of the present invention, it is possible to perform a CRC check and decryption in parallel. In other words, it is possible to start to decrypt a MAC-PDU consistent in packet length before completion of error detection on the MAC-PDU. Therefore, it is possible to improve (increase) throughput in reception.

According to one aspect of the present invention, it is possible to convert error detection and decryption in reception into pipeline processing, so that it is possible to achieve high throughput. Further, there is no need for a memory for awaiting a CRC check. Specifically, it is possible to perform pipeline processing at a cycle level.

In the above-described non-limiting embodiments, a description is given of WiMAX as an example communications system. The present invention may be applied to communications systems where packets are exchanged (transmitted and received) between a transmitter and a receiver and each packet includes a header and a subheader. In this case, the present invention may be applied to the case where the header includes size information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present inventions have been described in detail, it should be understood that various changes, substitutions, and alterations could be made hereto without departing from the spirit and scope of the invention.

What is claimed is:

1. A radio communications device, comprising:
a first error detection part configured to perform error detection on a header included in a packet;
a determination part configured to determine whether there is a consistency with respect to a length of the packet based on the header in response to the first error detection part detecting no error in the header;
a decryption part configured to decrypt the packet in response to the determination part determining that there is the consistency with respect to the length of the packet; and
a second error detection part configured to perform error detection on the packet in response to the determination part determining that there is the consistency with respect to the length of the packet,
wherein the decryption part is configured to start to decrypt the packet before a completion of the error detection by the second error detection part.

2. The radio communications device as claimed in claim 1, wherein the determination part is configured to determine whether there is the consistency with respect to the length of the packet based on control information included in the header of the packet.

3. The radio communications device as claimed in claim 2, wherein the determination part is configured to determine whether there is the consistency with respect to a length of an additional header included in the packet based on the control information included in the header of the packet.

4. The radio communications device as claimed in claim 3, wherein the control information included in the header of the packet includes information indicating a presence or absence of the additional header and information indicating a presence or absence of an error-detecting code.

5. The radio communications device as claimed in claim 3, wherein the header is a generic MAC header and the additional header is a subheader.

6. The radio communications device as claimed in claim 2, wherein the determination part is configured to determine whether there is the consistency with respect to a length of data included in the packet based on the control information included in the header of the packet.

7. The radio communications device as claimed in claim 6, wherein the control information included in the header of the packet includes information indicating a presence or absence of an additional header, information indicating a presence or absence of an error-detecting code, and information indicating whether the data included in the packet are encrypted.

8. The radio communications device as claimed in claim 7, wherein the header is a generic MAC header and the additional header is a subheader.

9. The radio communications device as claimed in claim 1, further comprising:
a discarding part configured to discard the packet in response to the determination part determining that there is not the consistency with respect to the length of the packet.

10. The radio communications device as claimed in claim 1, wherein the first error detection part is configured to perform the error detection on the header of the packet based on an error-detecting code included in the header.

11. The radio communications device as claimed in claim 1, further comprising:
a detection part configured to detect, based on a packet number included in the packet, at least one of a redundancy of the packet number of the packet and a reversing in order of the packet number of the packet; and
a delay part configured to delay a start of the detection by the detection part until the completion of the error detection by the second error detection part.

12. The radio communications device as claimed in claim 11, wherein the detection part is configured to allow the reversing in order of the packet number of the packet up to a predetermined packet number.

13. The radio communications device as claimed in claim 1, further comprising:
a reception part configured to receive the packet decrypted by the decryption part based on a result of the error detection by the second error detection part.

14. A reception method, comprising:
performing error detection on a header included in a packet;
determining whether there is a consistency with respect to a length of the packet based on the header based on a result of the error detection on the header;
decrypting the packet in response to determining that there is the consistency with respect to the length of the packet; and
performing error detection on the packet in response to determining that there is the consistency with respect to the length of the packet,
wherein decrypting the packet starts before a completion of the error detection on the packet.

15. The radio base station, comprising:
a radio communications device as set forth in claim 1.

16. The mobile station, comprising:
a radio communications device as set forth in claim 1.

* * * * *